United States Patent
Yan et al.

(10) Patent No.: US 9,450,638 B2
(45) Date of Patent: Sep. 20, 2016

(54) TX ANTENNA SELECTION FOR LTE IN MULTIPLE RADIO DEVICES

(71) Applicant: QUALCOMM Incorporated, San Diego, CA (US)

(72) Inventors: Hongbo Yan, San Diego, CA (US); Brian Clarke Banister, San Diego, CA (US); Daniel Filipovic, San Diego, CA (US); Mingxi Fan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/459,292

(22) Filed: Aug. 13, 2014

(65) Prior Publication Data

US 2015/0056933 A1 Feb. 26, 2015

Related U.S. Application Data

(60) Provisional application No. 61/869,620, filed on Aug. 23, 2013.

(51) Int. Cl.
| | |
|---|---|
| H04B 1/44 | (2006.01) |
| H04B 1/403 | (2015.01) |
| H04B 7/02 | (2006.01) |
| H04B 7/06 | (2006.01) |
| H04B 1/46 | (2006.01) |

(52) U.S. Cl.
CPC .............. *H04B 1/44* (2013.01); *H04B 1/406* (2013.01); *H04B 7/02* (2013.01); *H04B 7/06* (2013.01)

(58) Field of Classification Search
CPC .................................. H04B 1/44; H04B 1/406
USPC ............................................. 455/78, 82, 83
See application file for complete search history.

(56) References Cited

U.S. PATENT DOCUMENTS

| | | | |
|---|---|---|---|
| 5,819,184 A | 10/1998 | Cashman | |
| 6,957,081 B2 | 10/2005 | Leyh et al. | |
| 7,801,556 B2 | 9/2010 | Tran et al. | |
| 8,509,845 B2 | 8/2013 | Park et al. | |
| 2007/0298714 A1* | 12/2007 | Chiu ................... | H01Q 1/2275 455/41.2 |
| 2008/0043705 A1* | 2/2008 | Desai ................ | H04W 72/1215 370/346 |
| 2009/0137214 A1 | 5/2009 | Hofmann et al. | |
| 2011/0263214 A1* | 10/2011 | Robinson ............... | H04B 1/006 455/88 |
| 2014/0170990 A1* | 6/2014 | Black ..................... | H04B 1/401 455/73 |

OTHER PUBLICATIONS

International Search Report and Written Opinion—PCT/US2014/051080—ISA/EPO—Nov. 3, 2014.

\* cited by examiner

*Primary Examiner* — Ayodeji Ayotunde
(74) *Attorney, Agent, or Firm* — Arent Fox LLP

(57) ABSTRACT

Device antennas may be allocated such that a non-LTE module (e.g., GSM module or 1x module) shares the same antenna with an LTE DRx module. This may lead to degradation of a non-LTE voice service when the LTE DRx module performs LTE transmit antenna selection causing the non-LTE module to be switched to a different antenna during reception/transmission of voice slots, resulting in a loss of slots. Accordingly, a method, an apparatus, and a computer program product for controlling antenna switching are provided. The apparatus facilitates a first radio module to use a first antenna for performing a first operation, detects that a second radio module will attempt to use the first antenna during transmit antenna selection for performing a second operation, and determines whether to switch use of the first antenna from the first radio module to the second radio module based on a type of the first operation.

31 Claims, 14 Drawing Sheets

TX ANTENNA SELECTION FOR LTE IN MULTIPLE RADIO DEVICES

CROSS-REFERENCE TO RELATED APPLICATION(S)

This application claims the benefit of U.S. Provisional Application Ser. No. 61/869,620, entitled "TX ANTENNA SELECTION FOR LTE IN MULTIPLE RADIO DEVICES" and filed on Aug. 23, 2013, which is expressly incorporated by reference herein in its entirety.

BACKGROUND

1. Field

The present disclosure relates generally to communication systems, and more particularly, to determining whether to switch use of an antenna from a first radio module to a second radio module in a multi-radio device.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

Device antennas may be allocated such that a non-LTE radio module (e.g., GSM module or 1x module) shares the same antenna with an LTE DRx radio module. This may lead to degradation of a non-LTE voice service. When the LTE radio module performs LTE transmit antenna selection, the non-LTE radio module is caused to be switched to a different antenna during reception/transmission of voice slots. The non-LTE radio module being switched to the different antenna results in a loss of the voice slots. Accordingly, a method, a computer program product, and an apparatus are provided for controlling antenna switching to eliminate or lower a frequency of the LTE radio module performing the LTE transmit antenna selection if the non-LTE radio module concurrently engaging in a higher priority operation is connected to a same antenna used by the LTE radio module for performing the LTE transmit antenna selection.

In an aspect, the apparatus facilitates a first radio module to use a first antenna for performing a first operation, detects that a second radio module will attempt to use the first antenna during transmit antenna selection for performing a second operation, and determines whether to switch use of the first antenna from the first radio module to the second radio module based on a type of the first operation.

DETAILED DESCRIPTION

Figure 1:
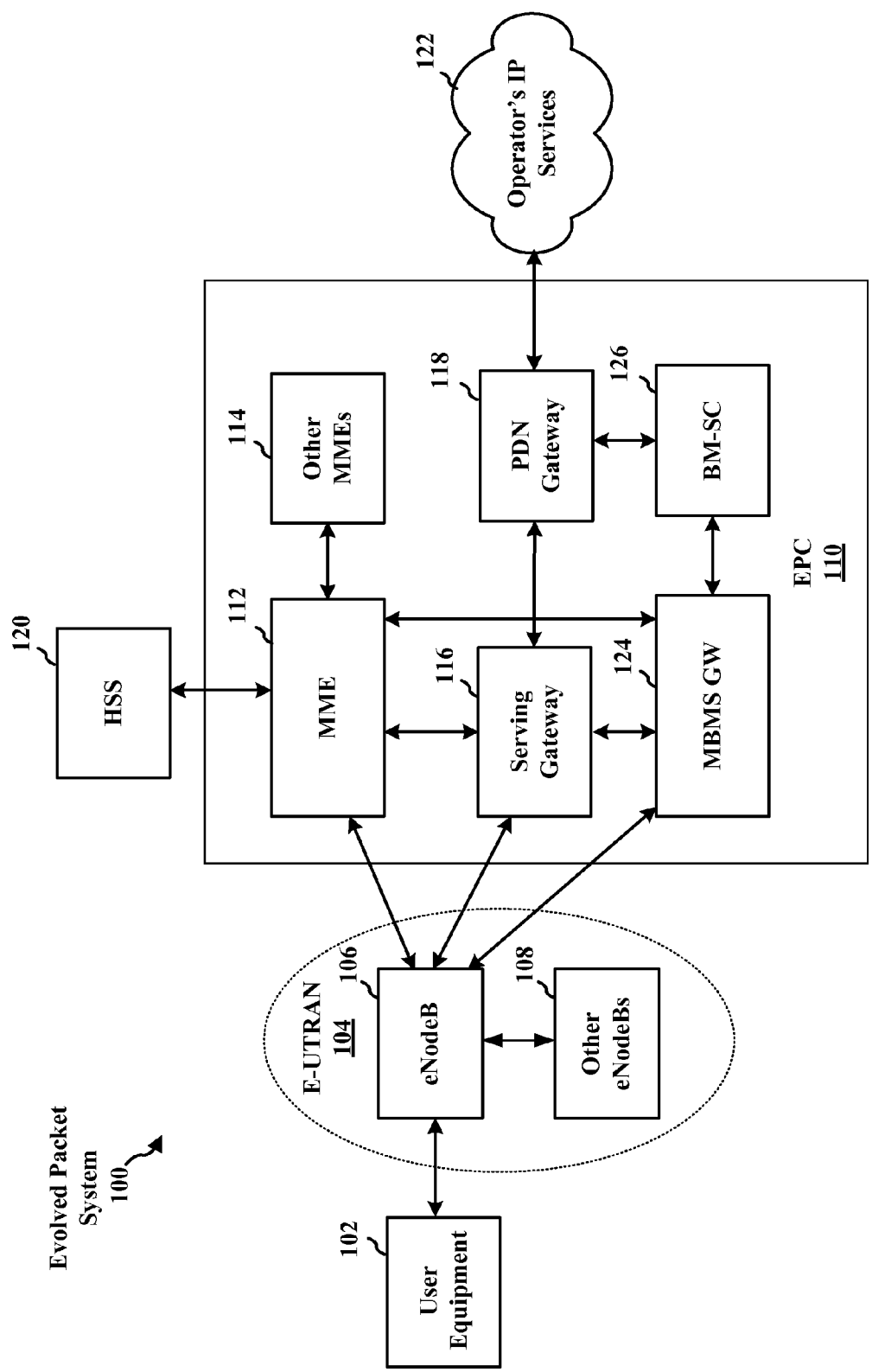
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, digital versatile disc (DVD), and floppy disk where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, an intranet, an IP Multimedia Subsystem (IMS), and a PS Streaming Service (PSS). The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
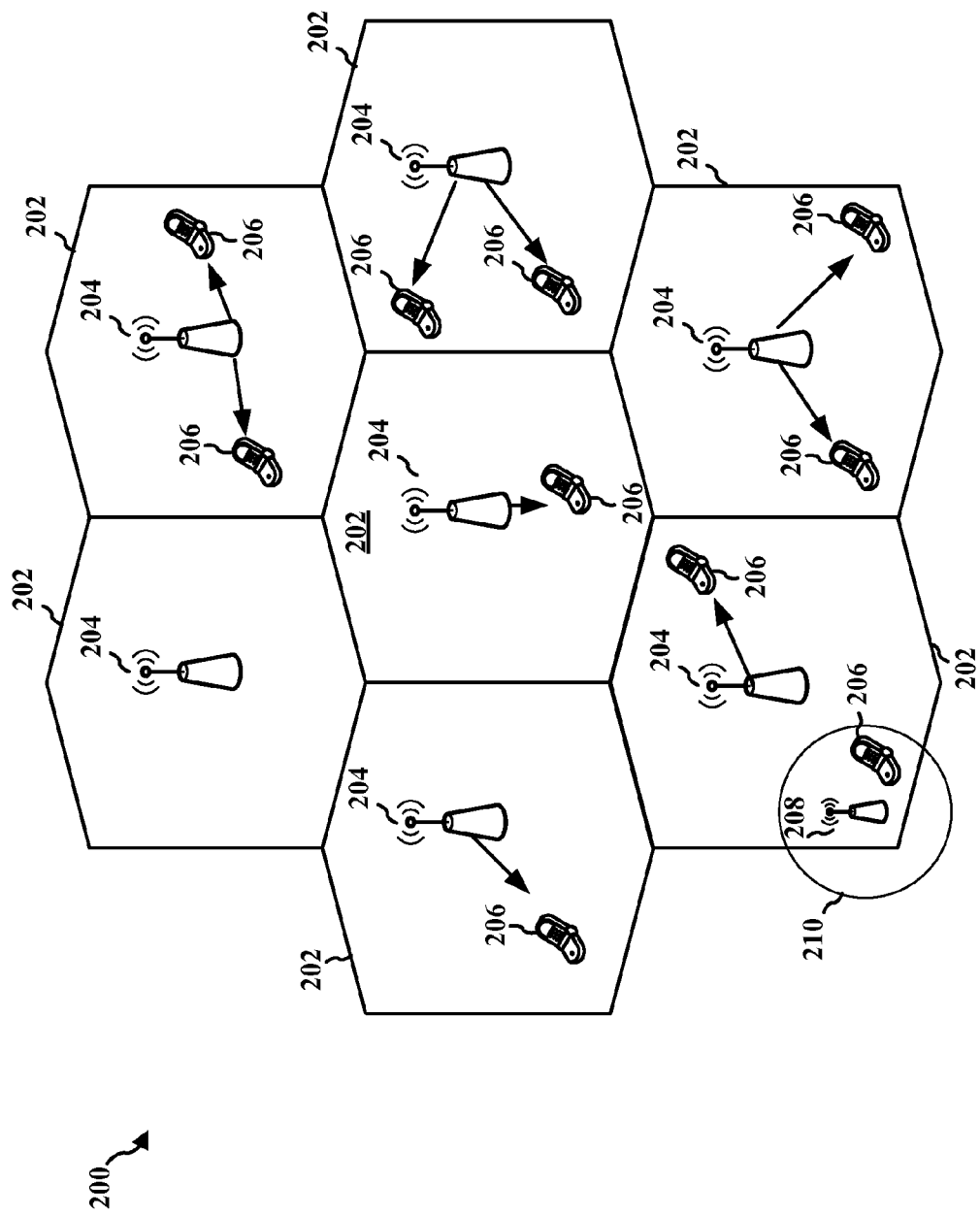
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sector). The term "cell" can refer to the smallest coverage area of an eNB and/or an eNB subsystem serving a particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (Wi-MAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
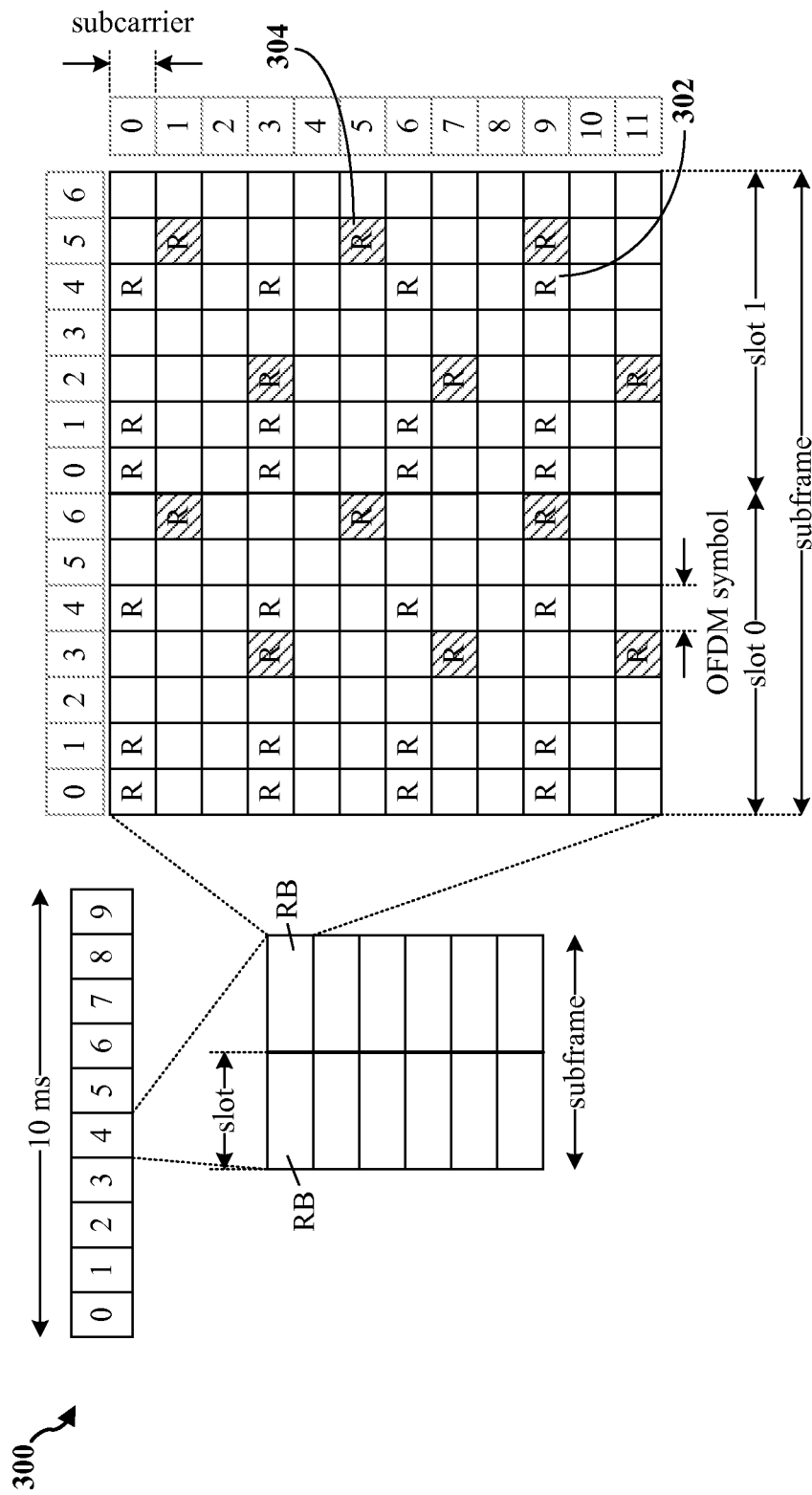
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including one or more resource blocks. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
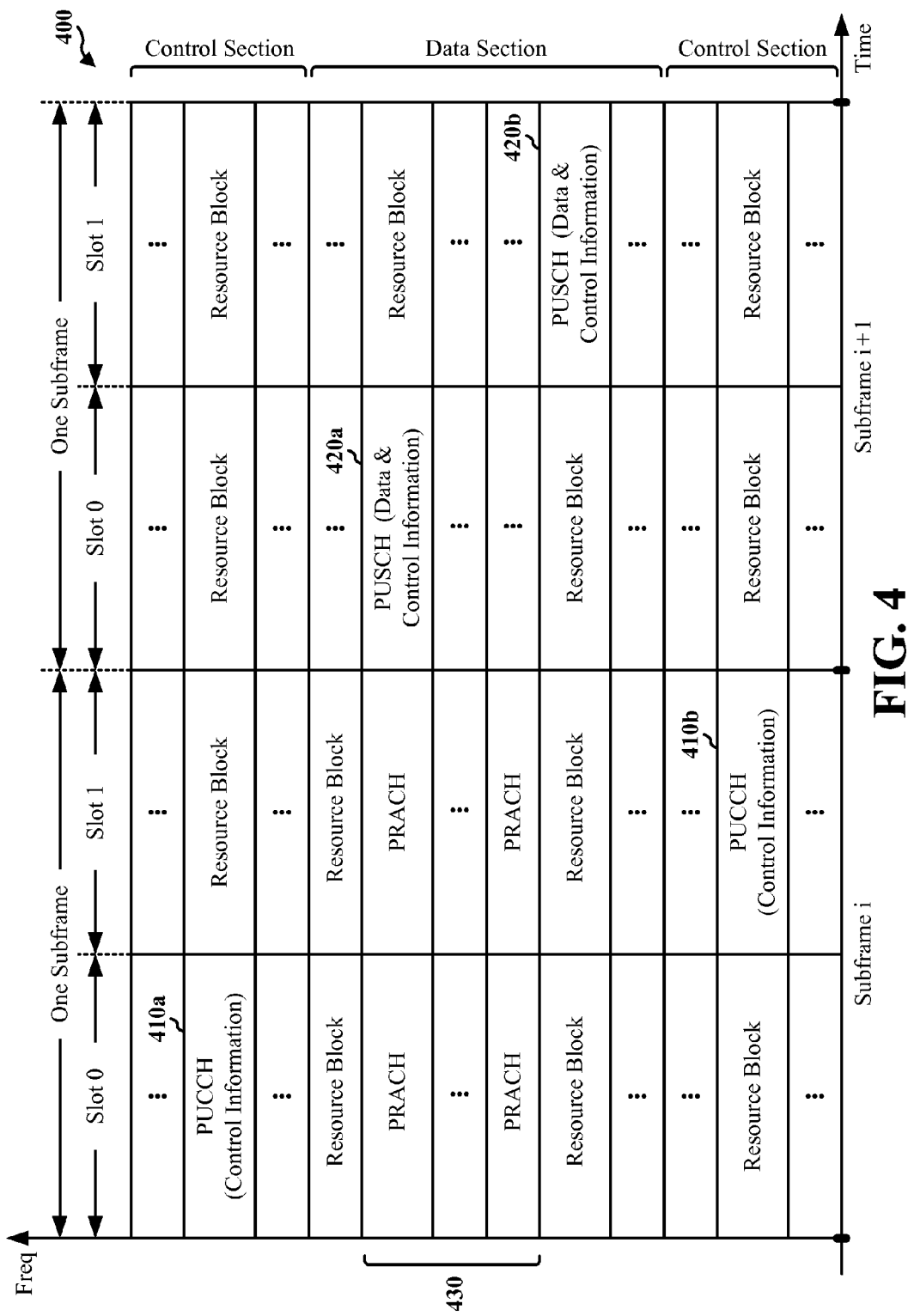
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
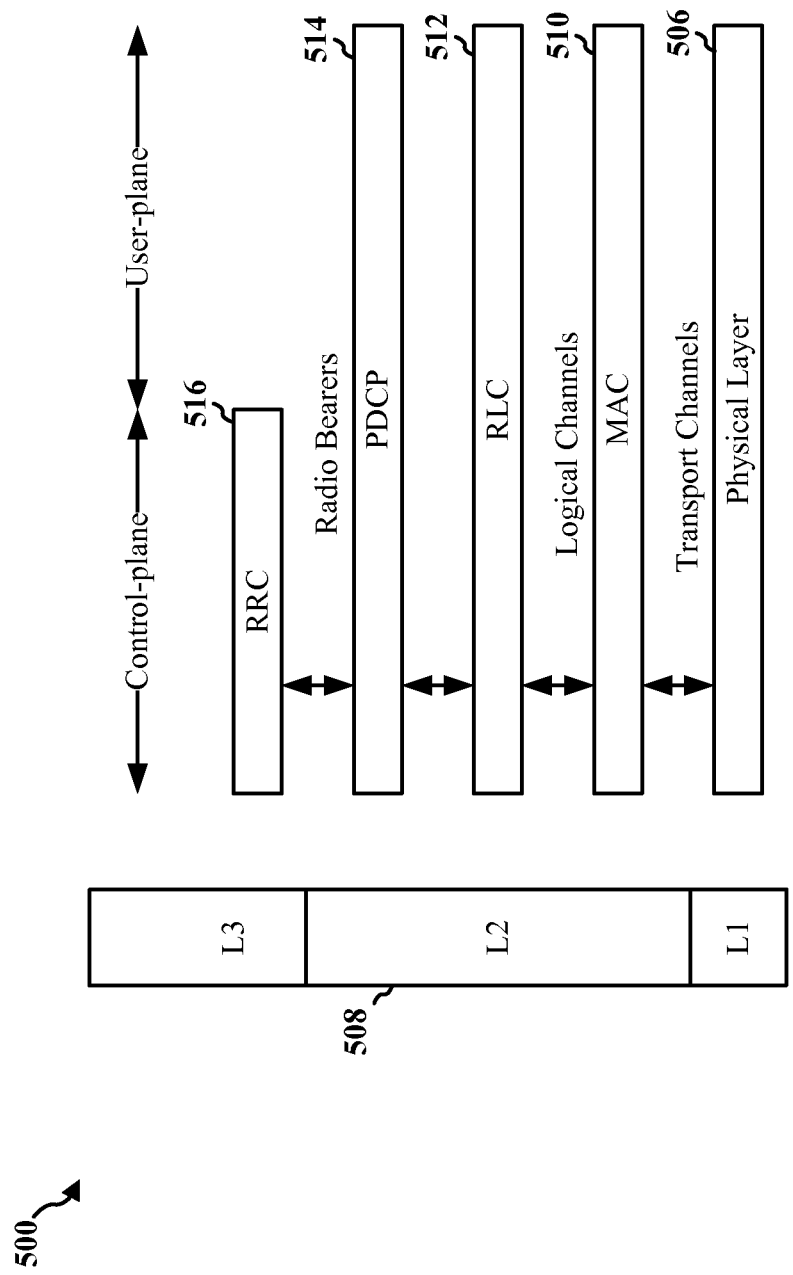
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
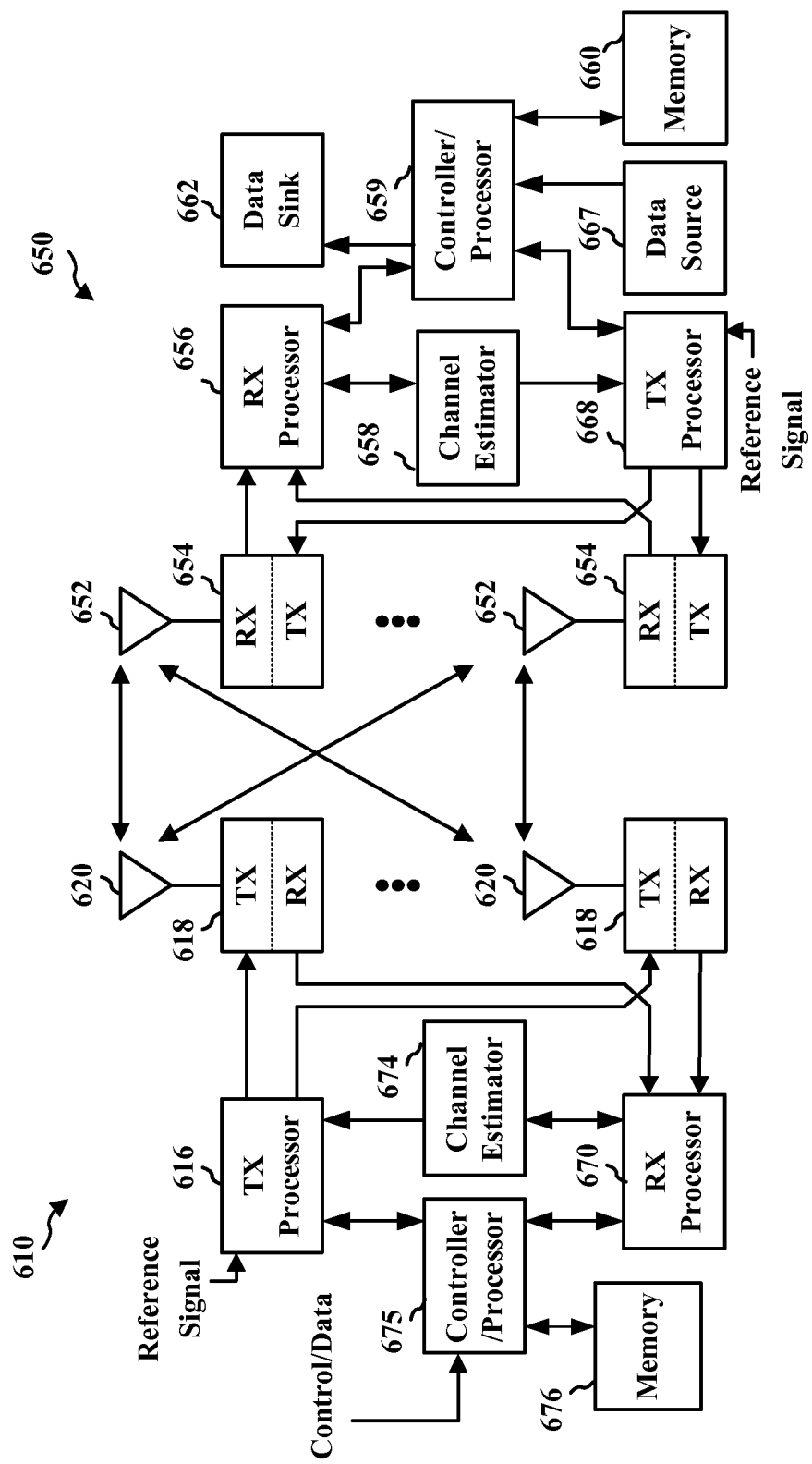
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the DL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
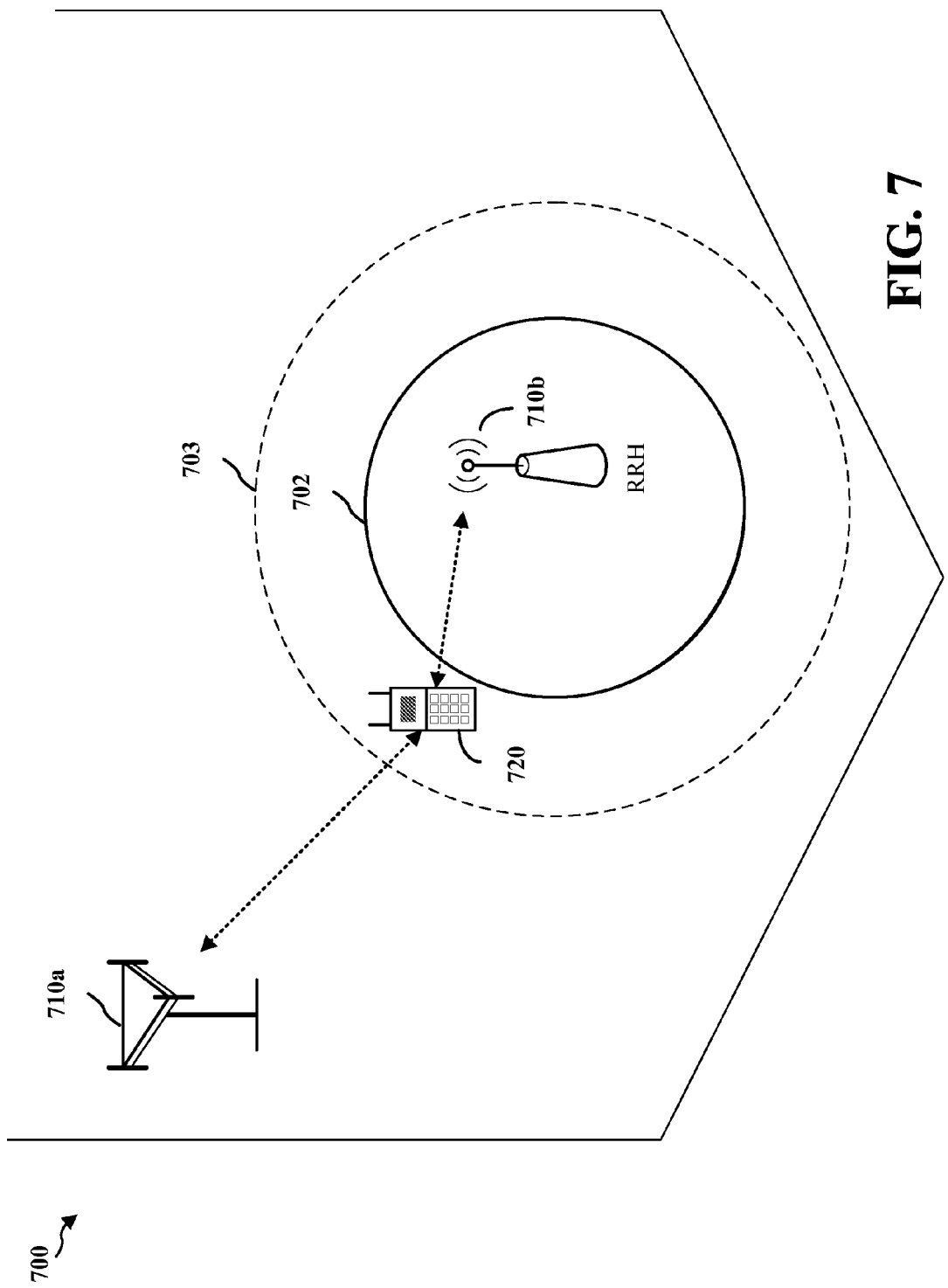
FIG. 7 is a diagram illustrating a range expanded cellular region in a heterogeneous network.

FIG. 7 is a diagram 700 illustrating a range expanded cellular region in a heterogeneous network. A lower power class eNB such as the RRH 710b may have a range expanded cellular region 703 that is expanded from the cellular region 702 through enhanced inter-cell interference coordination between the RRH 710b and the macro eNB 710a and through interference cancelation performed by the UE 720. In enhanced inter-cell interference coordination, the RRH 710b receives information from the macro eNB 710a regarding an interference condition of the UE 720. The information allows the RRH 710b to serve the UE 720 in the range expanded cellular region 703 and to accept a handoff of the UE 720 from the macro eNB 710a as the UE 720 enters the range expanded cellular region 703.

UE transmit antenna selection includes open-loop and closed-loop operations. During an open-loop operation, a device may transmit sounding reference symbols (SRS) on port0 or port1. A physical uplink scheduling channel (PUSCH) or a physical uplink control channel (PUCCH) may be transmitted on port0. A periodicity for SRS antenna switching may be as often as 2 ms. During a closed-loop operation, all uplink signals may be transmitted on port0 or port1 depending on eNB signaling, and may have a periodicity of 1 ms. Infrastructure vendors currently support the open-loop operation.

Figure 8:
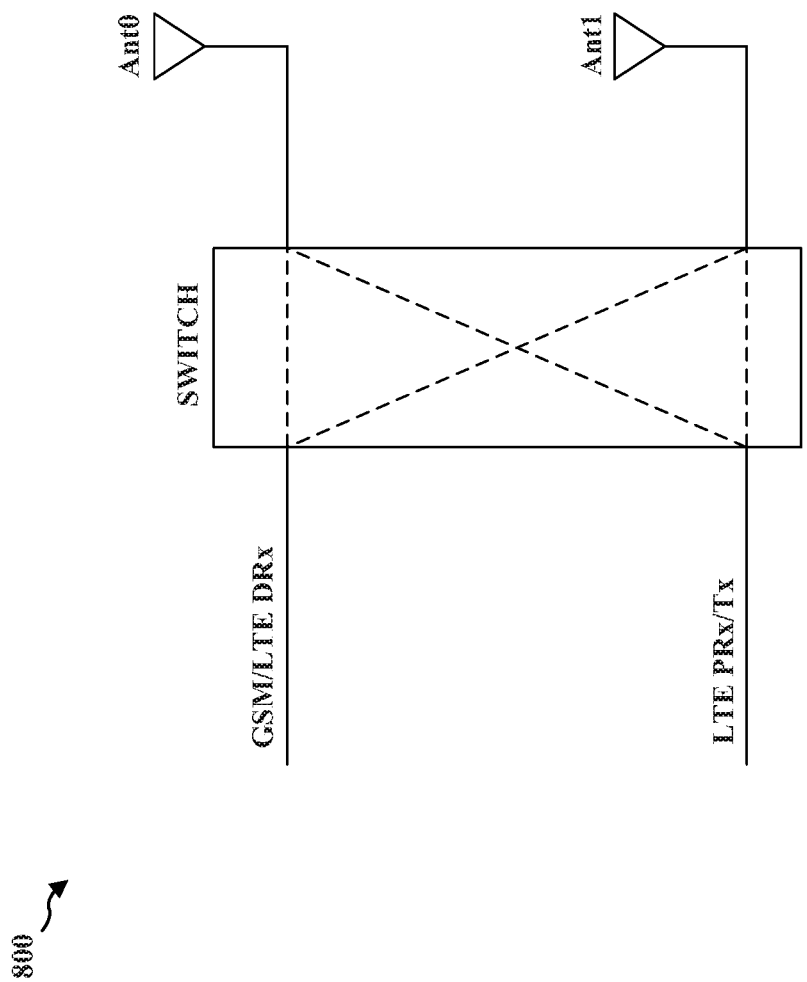
FIG. 8 is a diagram illustrating an example of a device antenna allocation.

FIG. 8 is a diagram 800 illustrating an example of a device antenna allocation. Referring to FIG. 8, from a UE perspective, device original equipment manufacturers (OEMs) may allocate antennas in a device such that a non-LTE module (e.g., GSM module or 1x module) shares the same antenna (e.g., Ant0) with an LTE DRx module. Such a device may operate according to various systems, such as simultaneous GSM and LTE (SGLTE), simultaneous voice and LTE (SVLTE), GSM+LTE Dual SIM Dual Active (DSDA), and WCDMA+LTE DSDA, for example. Allocating the antenna to both the non-LTE and LTE radio modules may be common amongst device manufacturers trying to limit a number of device antennas to reduce device size or cut cost. The antenna allocation scheme, however, may lead to degradation of a non-LTE voice service when the device performs LTE transmit antenna selection.

Figure 9:
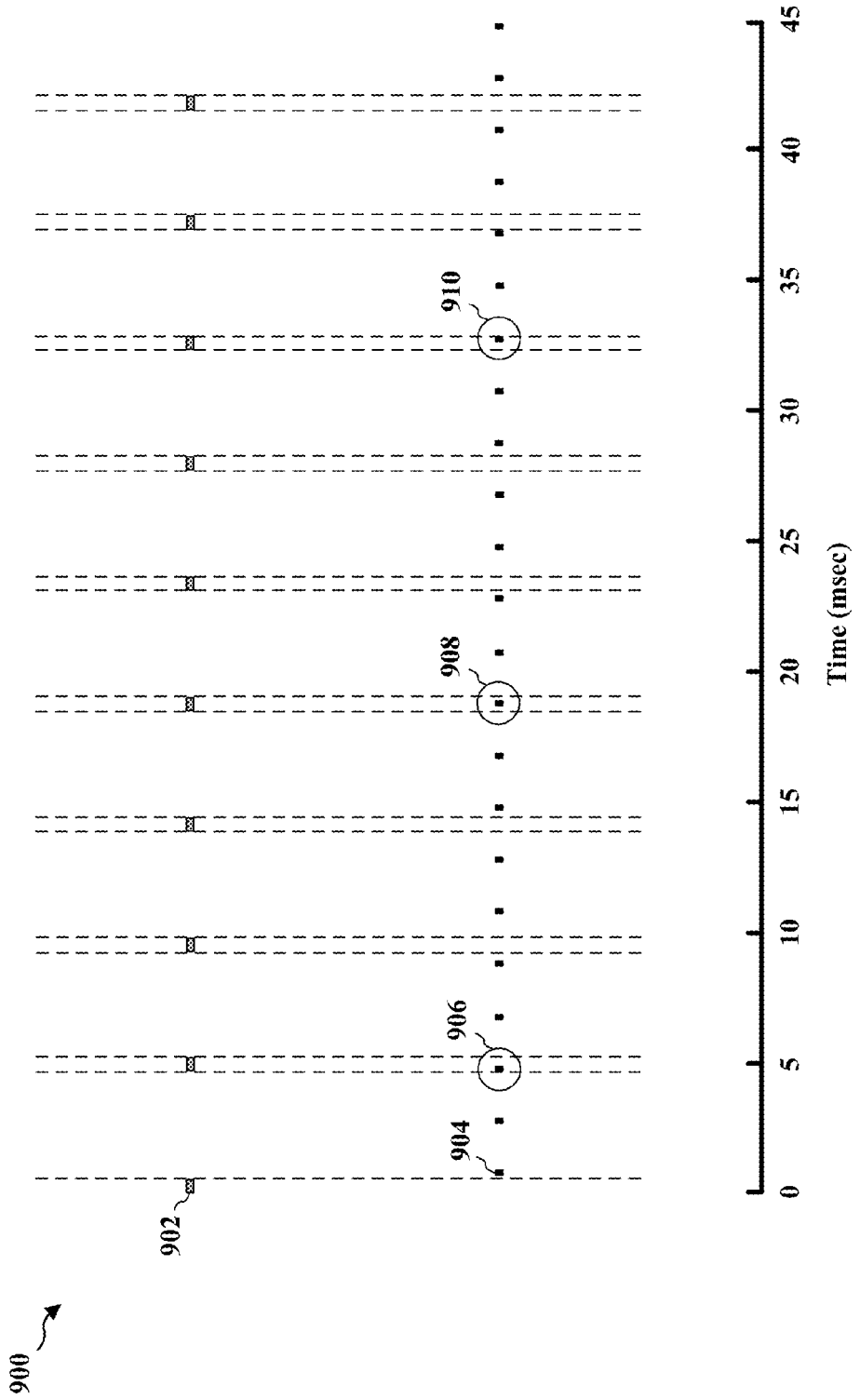
FIG. 9 is a diagram illustrating concurrence between LTE sounding reference signal (SRS) symbols and GSM voice traffic slots over a period of time.

FIG. 9 is a diagram 900 illustrating concurrence between LTE sounding reference signal (SRS) symbols and GSM voice traffic slots over a period of time. In FIG. 9, a GSM voice traffic slot 902 may be received or transmitted approximately every 4 to 5 ms. An SRS symbol 904 for an LTE operation may be transmitted every 2 ms. As shown at 906, 908, and 910, the transmission of the LTE SRS symbol may occur at the same time as (i.e., collide with) the reception/transmission of the GSM voice traffic slot. Currently, while an LTE module performs LTE transmit antenna selection (e.g., SRS switching), a GSM module performing a GSM voice call may be switched to a different antenna during reception/transmission of voice traffic slots. This causes the voice traffic slots to be lost. As shown in FIG. 9, a total of ten GSM voice traffic slots are received/transmitted over the period of time. However, when the LTE module performs the SRS switching at a rate of 2 ms, three out of ten (30%) of the GSM voice traffic slots coincide with an SRS symbol transmission (906, 908, and 910), and are therefore lost due to the GSM module switching to the different antenna. As a result, the GSM call will likely be dropped.

In an aspect, the present disclosure provides for eliminating or lowering the frequency of the LTE radio module performing the LTE transmit antenna selection if there exists a non-LTE radio module concurrently engaging in a higher priority operation and connected to a same antenna used by the LTE radio module for performing the LTE transmit antenna selection. Solutions provided in the present disclosure are beneficial toward lowering device manufacturing costs and preserving device footprint.

Figure 10:
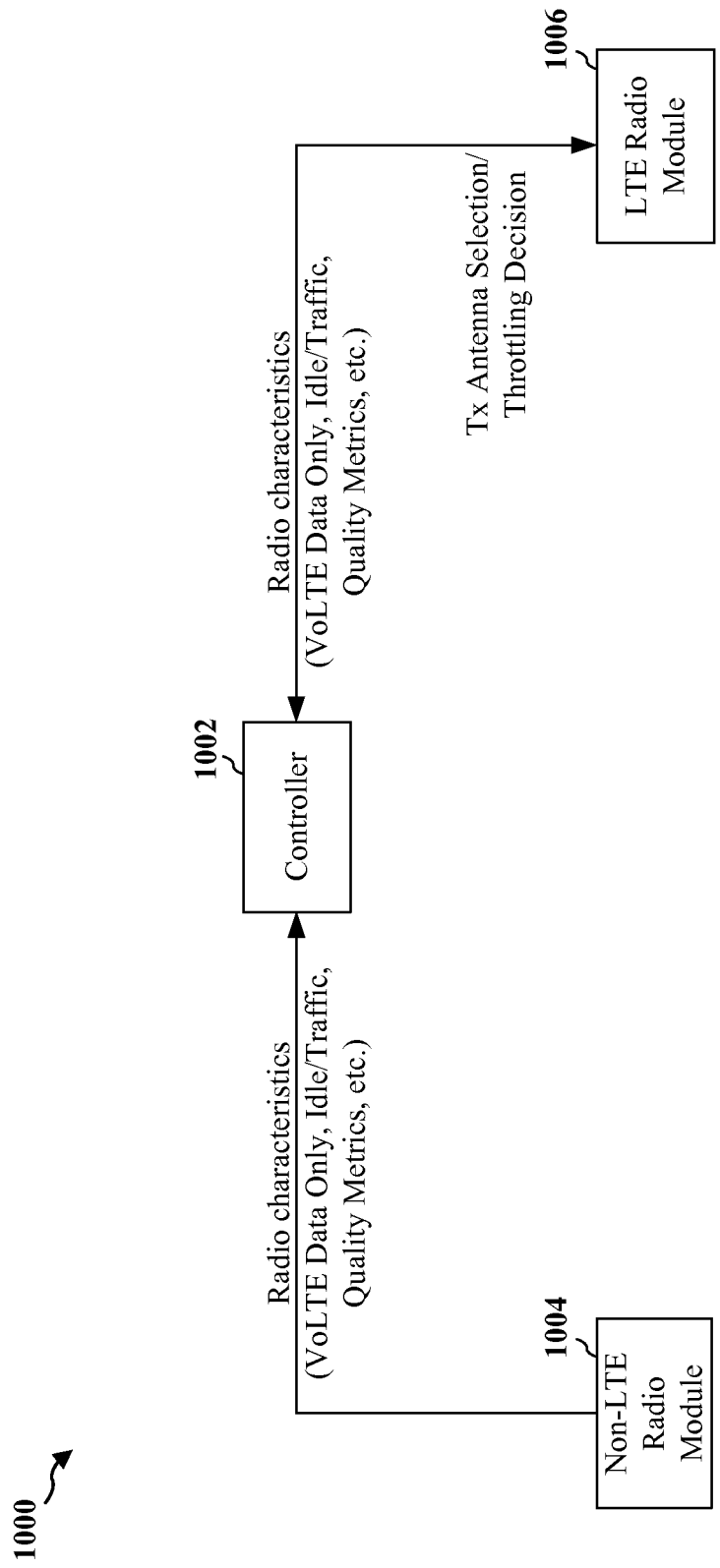
FIG. 10 is a diagram illustrating examples of controlling antenna switching between an LTE radio module and a non-LTE radio module.

FIG. 10 is a diagram 1000 illustrating examples of controlling antenna switching between an LTE radio module and a non-LTE radio module. Referring to FIG. 10, a controller 1002 may eliminate or lower the frequency at which an LTE radio module 1006 performs UE transmit antenna selection. The controller 1002 may throttle the ability of the LTE radio module 1006 to use an antenna for performing UE transmit antenna selection when a non-LTE radio module 1004 is connected to the same antenna to be selected by the LTE radio module 1006 and the non-LTE radio module 1004 is concurrently performing a higher priority operation.

In an aspect, the higher priority operation performed by the non-LTE radio module 1004 may be a voice call. Thus, if the non-LTE radio module 1004 is performing a voice call, and if the LTE radio module 1006 provides a data-only LTE service, the controller 1002 may throttle the ability of the LTE radio module 1006 to perform transmit antenna selection. For example, throttling may include the controller 1002 refraining from switching the LTE radio module 1006 to use the antenna to perform the transmit antenna selection.

Alternatively, if the non-LTE radio module 1004 is performing the voice call, and if the LTE radio module provides an on-hold Voice over LTE (VoLTE) service, the controller 1002 may throttle the ability of the LTE radio module 1006 to perform transmit antenna selection. In another alternative, if the non-LTE radio module 1004 is performing the voice call, and if the LTE radio module 1006 provides a foreground VoLTE service while communicating at a high LTE signal quality, the controller 1002 may throttle the ability of the LTE radio module 1006 to perform transmit antenna selection.

In another aspect, the higher priority operation performed by the non-LTE radio module 1004 may be a delay-sensitive data call (e.g., streaming video). Thus, if the non-LTE radio module 1004 is performing the delay-sensitive data call, and if the LTE radio module 1006 provides a data-only LTE service, the controller 1002 may throttle the ability of the LTE radio module 1006 to perform transmit antenna selection. Alternatively, if the non-LTE radio module 1004 is performing the delay-sensitive data call, and if the LTE radio module 1006 provides a VoLTE service while communicating at a high LTE signal quality, the controller 1002 may throttle the ability of the LTE radio module 1006 to perform transmit antenna selection.

In a further aspect, the higher priority operation performed by the non-LTE radio module 1004 may be an idle mode close to sensitivity. Accordingly, if the non-LTE radio module 1004 is in an idle mode wake period, the controller 1002 may throttle the ability of the LTE radio module 1006 to perform transmit antenna selection.

Figure 11A:
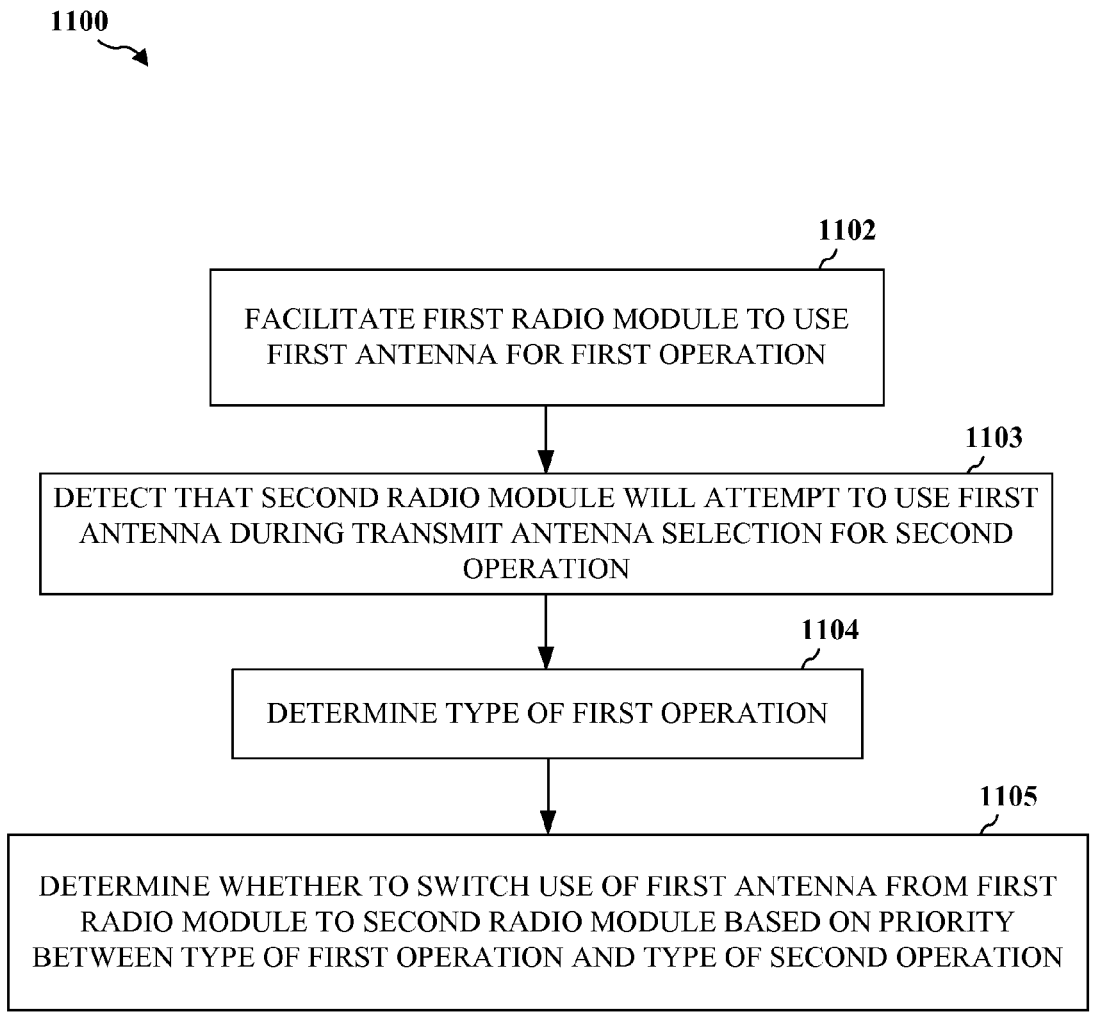
FIGS. 11A and 11B are flow charts of a method of controlling antenna switching.

FIG. 11A is a flow chart 1100 of a method of controlling antenna switching for wireless communication. The method may be performed by a UE. At step 1102, the UE facilitates a first radio module to use a first antenna for performing a first operation. At step 1103, the UE detects an intent of a second radio module to use the first antenna during transmit antenna selection for performing a second operation. The second radio module may be an LTE radio module, for example.

At step 1104, the UE determines a type of the first operation. The first operation may be any of a voice call, a delay-sensitive data call (e.g., streaming video), or an idle mode, for example. The second operation may be any of a data-only LTE service, an on-hold Voice over LTE (VoLTE) service, or a foreground VoLTE service, for example. Furthermore, the different types of operations may have different priority. For example, priority may favor low latency operations over operations that can support high latency (e.g., voice call (first operation) over data-only LTE service (second operation)). In another example, priority may favor the idle mode (first operation) over any type of second operation when the UE is in a wake period. Thus, one operation may have higher priority than another operation.

Thereafter, at step 1105, the UE may determine whether to switch use of the first antenna from the first radio module to the second radio module based on a priority between the type of the first operation and a type of the second operation.

In an aspect, when the type of the first operation is the voice call or an operation conducted during a poor channel condition, the UE may further determine that the type of the second operation is a sounding reference signal (SRS) transmission. Accordingly, the UE may determine whether to switch use of the first antenna by identifying that the SRS transmission has a lower priority than the type of the first operation (e.g., voice call) and refraining from switching the second radio module to use the first antenna when the SRS transmission has the lower priority. The UE may further drop the lower-priority SRS transmission.

Figure 11B:
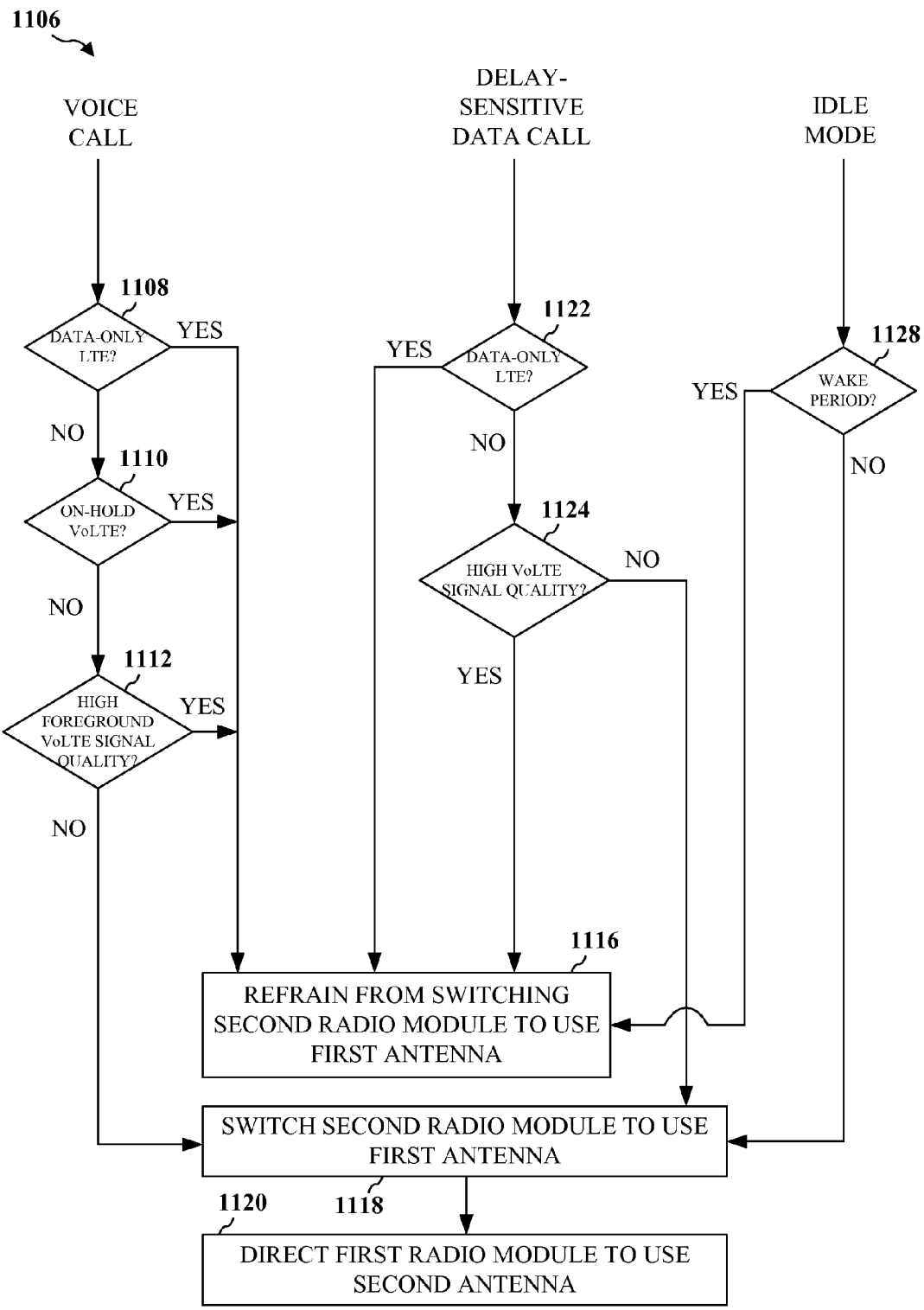

FIG. 11B is a flow chart 1106 detailing step 1105 of FIG. 11A. In an aspect, the UE may determine whether to switch use of the first antenna from the first radio module to the second radio module by determining a type of the second operation and refraining from switching the second radio module to use the first antenna when the type of the second operation has a lower priority than the type of the first operation. In an aspect, when the first operation is a voice call, the UE may determine whether the type of the second operation is included in a set of operations. Here, the set of operations may include at least one of a LTE data-only service, an on-hold Voice over LTE (VoLTE) service, or a foreground VoLTE service while communicating at a high LTE signal quality. When the type of the second operation is determined to be in the set of operations, the UE identifies that the type of the second operation has the lower priority and refrains from switching the second radio module to use the first antenna. In an aspect, the UE refrains from switching the second radio module to use the first antenna for a duration of the first operation. In another aspect, the UE refrains from switching the second radio module to use the first antenna at a time slot used for performing the first operation. In a further aspect, when the type of the second operation is determined not to be in the set of operations, the UE identifies that the type of the second operation has a higher priority than the voice call and switches the second radio module to use the first antenna.

For example, at step 1108, the UE determines whether the type of the second operation is a LTE data-only service. Based on a positive result, the UE proceeds to step 1116 and refrains from switching the second radio module to use the first antenna. Based on a negative result, the UE proceeds to step 1110.

At step 1110, the UE determines whether the type of the second operation is an on-hold VoLTE service. Based on a positive result, the UE proceeds to step 1116 and refrains from switching the second radio module to use the first antenna. Based on a negative result, the UE proceeds to step 1112.

At step 1112, the UE may determine that the type of the second operation is a foreground VoLTE service, and further determines whether the UE is communicating at a high LTE signal quality. When the type of the second operation is the foreground VoLTE service and the UE communicates at a high LTE signal quality, the UE proceeds to step 1116 and refrains from switching the second radio module to use the first antenna.

Based on a negative result at step 1112, the UE proceeds to step 1118. At step 1118, the UE determines that the second operation is not in the set of operations and switches the second radio module to use the first antenna. Thereafter, at step 1120, the UE may optionally direct the first radio module to use a second antenna for performing the first operation.

In a further aspect, when the first operation is a delay-sensitive data call, the UE may determine whether the type of the second operation is included in a set of operations. Here, the set of operations may include at least one of a LTE data-only service or a VoLTE service while communicating at a high LTE signal quality. When the type of the second operation is determined to be in the set of operations, the UE identifies that the type of the second operation has the lower priority and refrains from switching the second radio module to use the first antenna. In an aspect, the UE refrains from switching the second radio module to use the first antenna for a duration of the first operation. In another aspect, the UE refrains from switching the second radio module to use the first antenna at a time slot used for performing the first operation. In a further aspect, when the type of the second operation is determined not to be in the set of operations, the UE identifies that the type of the second operation has a higher priority than the delay-sensitive data call and switches the second radio module to use the first antenna.

For example, at step 1122, the UE determines whether the type of the second operation is a LTE data-only service. Based on a positive result, the UE proceeds to step 1116 and refrains from switching the second radio module to use the first antenna. Based on a negative result, the UE proceeds to step 1124.

At step 1124, the UE determines that the type of the second operation is a VoLTE service, and further determines whether the UE is communicating at a high LTE signal quality. When the type of the second operation is the VoLTE service and the UE communicates at a high LTE signal quality, the UE proceeds to step 1116 and refrains from switching the second radio module to use the first antenna.

Based on a negative result at step 1124, the UE proceeds to step 1118. At step 1118, the UE determines that the type of the second operation is not in the set of operations and switches the second radio module to use the first antenna. Thereafter, at step 1120, the UE may optionally direct the first radio module to use a second antenna for performing the first operation.

In another aspect, when the type of the first operation is an idle mode, at step 1128, the UE determines whether the UE is in an idle mode wake period. Based on a positive result, the UE identifies that the type of the second operation has the lower priority and proceeds to step 1116 wherein the UE refrains from switching the second radio module to use the first antenna during the idle mode wake period. Based on a negative result, the UE determines that the UE is in an idle mode sleep period and identifies that the type of the second operation has a higher priority than the idle mode. The UE then proceeds to step 1118, wherein the UE switches the second radio module to use the first antenna during the idle mode sleep period.

Figure 12:
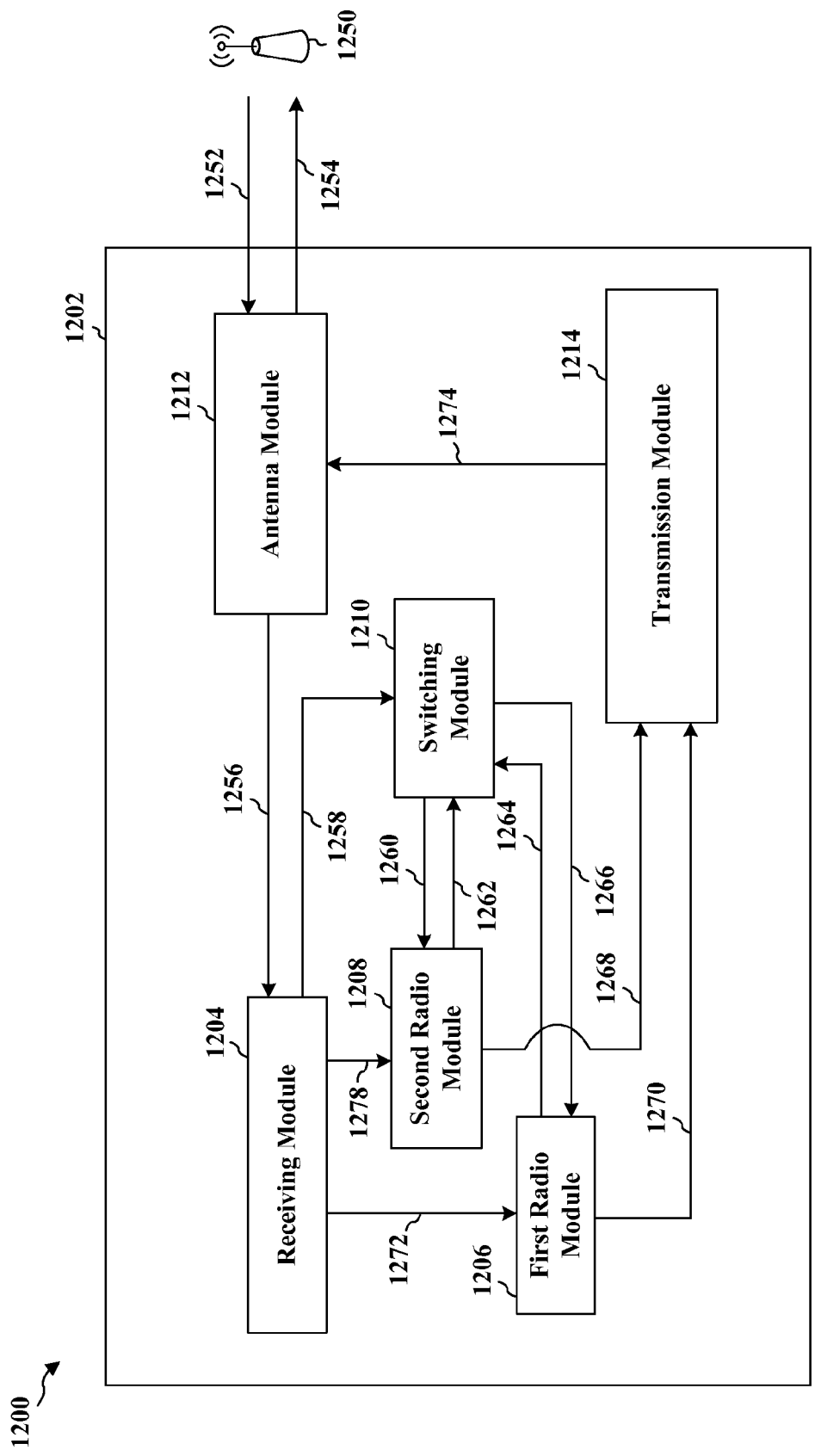
FIG. 12 is a conceptual data flow diagram illustrating the data flow between different modules/means/components in an exemplary apparatus.

FIG. 12 is a conceptual data flow diagram 1200 illustrating the data flow between different modules/means/components in an exemplary apparatus 1202. The apparatus may be a UE controlling antenna switching for wireless communication. The apparatus includes a receiving module 1204, a first radio module 1206, a second radio module 1208, a switching module 1210, an antenna module 1212, and a transmission module 1214.

The switching module 1210 provides signaling 1266 to facilitate the first radio module 1206 to use a first antenna of the antenna module 1212 for performing a first operation. The first radio module 1206 may perform the first operation via the transmission module 1214 and the first antenna of the antenna module 1212. For example, the first radio module 1206 may send a signal 1270 to the transmission module 1214, prompting the transmission module 1214 to send a signal 1274 to the first antenna of the antenna module 1212. The first antenna of the antenna module 1212 may then send a signal 1254 to a base station 1250 corresponding to the signals 1270 and 1274. The first radio module 1206 may also perform the first operation via the receiving module 1204. For example, the first antenna of the antenna module 1212 may receive a signal 1252 from the base station 1250, prompting the antenna module 1212 to send a signal 1256 to the receiving module 1204. The first radio module 1206 may then receive a signal 1272 from the receiving module 1204 corresponding to the signals 1252 and 1256. The switching module 1210 detects via communication of a signal 1260 and/or a signal 1262 that the second radio module 1208 will attempt to use the first antenna of the antenna module 1212 during transmit antenna selection for performing a second operation. The second radio module 1208 may perform the second operation via the transmission module 1214 and the antenna module 1212. For example, the second radio module 1208 may send a signal 1268 to the transmission module 1214, prompting the transmission module 1214 to send a signal 1274 to the antenna module 1212. The antenna module 1212 may then send a signal 1254 to the base station 1250 corresponding to the signals 1268 and 1274. The second radio module 1208 may also perform the second operation via the receiving module 1204. For example, the antenna module 1212 may receive a signal 1252 from the base station 1250, prompting the antenna module 1212 to send a signal 1256 to the receiving module 1204. The second radio module 1208 may then receive a signal 1278 from the receiving module 1204 corresponding to the signals 1252 and 1256. The second radio module 1208 may be an LTE radio module, for example.

The switching module 1210 determines a type of the first operation via signaling 1258 received from the receiving module 1204 and/or signaling 1264 received from the first radio module 1206. Thereafter, the switching module 1210 may determine whether to switch use of the first antenna of the antenna module 1212 from the first radio module 1206 to the second radio module 1208 based on a priority between the type of the first operation and a type of the second operation. For example, the type of the first operation may be a voice call, a delay-sensitive data call, or an idle mode.

In an aspect, when the type of the first operation is the voice call or an operation conducted during a poor channel condition, the switching module 1210 may further determine via signaling 1262 received from the second radio module 1208 and/or signaling 1258 received from the receiving module 1204 that the type of the second operation is a sounding reference signal (SRS) transmission. Accordingly, the switching module 1210 may determine whether to switch use of the first antenna of the antenna module 1212 by identifying that the SRS transmission has a lower priority than the type of the first operation (e.g., voice call) and refraining from switching the second radio module 1208 to use the first antenna when the SRS transmission has the lower priority. The switching module 1210 may further drop the lower-priority SRS transmission.

In an aspect, the switching module 1210 may determine whether to switch use of the first antenna of the antenna module 1212 from the first radio module 1206 to the second radio module 1208 by determining a type of the second operation and refraining from switching the second radio module 1208 to use the first antenna of the antenna module 1212 when the type of the second operation has a lower priority than the type of the first operation. In an aspect, when the first operation is a voice call, the switching module 1210 may determine whether the type of the second operation is included in a set of operations. Here, the set of operations may include at least one of a LTE data-only service, an on-hold Voice over LTE (VoLTE) service, or a foreground VoLTE service while communicating at a high LTE signal quality. When the type of the second operation is determined to be in the set of operations, the switching module 1210 identifies that the type of the second operation has the lower priority and refrains from switching the second radio module 1208 to use the first antenna of the antenna module 1212. In an aspect, the switching module 1210 refrains from switching the second radio module 1208 to use the first antenna of the antenna module 1212 for a duration of the first operation. In another aspect, the switching module 1210 refrains from switching the second radio module 1208 to use the first antenna of the antenna module 1212 at a time slot used for performing the first operation. In a further aspect, when the type of the second operation is determined not to be in the set of operations, the switching module 1210 identifies that the type of the second operation has a higher priority than the voice call and provides signaling 1260 to the second radio module 1208 to trigger use of the first antenna of the antenna module 1212.

For example, the switching module 1210 determines via signaling 1262 received from the second radio module 1208 and/or signaling 1258 received from the receiving module 1204 whether the type of the second operation is a LTE data-only service. If so, the switching module 1210 refrains from switching the second radio module 1208 to use the first antenna of the antenna module 1212. If the type of the second operation is not the LTE data-only service, the switching module 1210 determines via signaling 1262 received from the second radio module 1208 and/or signaling 1258 received from the receiving module 1204 whether the second operation is an on-hold VoLTE service. If the type of the second operation is the on-hold VoLTE service, the switching module 1210 refrains from switching the second radio module 1208 to use the first antenna of the antenna module 1212.

If the type of the second operation is not the on-hold LTE service, the switching module 1210 may determine via signaling 1262 received from the second radio module 1208 and/or signaling 1258 received from the receiving module 1204 that the type of the second operation is a foreground VoLTE service, and may further determine whether the apparatus 1202 is communicating at a high LTE signal quality. When the type of the second operation is the foreground VoLTE service and the apparatus 1202 communicates at a high LTE signal quality, the switching module 1210 refrains from switching the second radio module 1208 to use the first antenna.

If the type of the second operation is not the foreground VoLTE service and/or the apparatus 1202 does not communicate at a high LTE signal quality, the switching module 1210 determines that the type of the second operation is not in the set of operations and provides signaling 1260 to the second radio module 1208 to trigger use of the first antenna of the antenna module 1212. Thereafter, the switching module 1210 may optionally provide signaling 1266 to the first radio module 1206 to trigger use of a second antenna of the antenna module 1212 for performing the first operation.

In a further aspect, when the first operation is a delay-sensitive data call, the switching module 1210 may determine via signaling 1262 received from the second radio module 1208 and/or signaling 1258 received from the receiving module 1204 whether the type of the second operation is included in a set of operations. Here, the set of operations may include at least one of a LTE data-only service or a VoLTE service while communicating at a high LTE signal quality. When the type of the second operation is determined to be in the set of operations, the switching module 1210 identifies that the type of the second operation has the lower priority and refrains from switching the second radio module 1208 to use the first antenna of the antenna module 1212. In an aspect, the switching module 1210 refrains from switching the second radio module 1208 to use the first antenna of the antenna module 1212 for a duration of the first operation. In another aspect, the switching module 1210 refrains from switching the second radio module 1208 to use the first antenna of the antenna module 1212 at a time slot used for performing the first operation. In a further aspect, when the type of the second operation is determined not to be in the set of operations, the switching module 1210 identifies that the type of the second operation has a higher priority than the delay-sensitive data call and provides signaling 1260 to the second radio module 1208 to trigger use of the first antenna of the antenna module 1212.

For example, the switching module 1210 determines via signaling 1262 received from the second radio module 1208 and/or signaling 1258 received from the receiving module 1204 whether the type of the second operation is a LTE data-only service. When the type of the second operation is the LTE data-only service, the switching module 1210 refrains from switching the second radio module 1208 to use the first antenna of the antenna module 1212. When the type of the second operation is not the LTE data-only service, the switching module 1210 may determine via signaling 1262 received from the second radio module 1208 and/or signaling 1258 received from the receiving module 1204 whether the type of the second operation is a VoLTE service.

When the type of the second operation is the VoLTE service, the switching module 1210 determines via signaling 1262 received from the second radio module 1208 and/or signaling 1258 received from the receiving module 1204 whether the apparatus 1202 is communicating at a high LTE signal quality. When the type of the second operation is the VoLTE service and the apparatus 1202 communicates at a high LTE signal quality, the switching module 1210 refrains from switching the second radio module 1208 to use the first antenna of the antenna module 1212.

If the type of the second operation is not the VoLTE service and/or the apparatus 1202 does not communicate at a high LTE signal quality, the switching module 1210 determines that the second operation is not in the set of operations and provides signaling 1260 to the second radio module 1208 to trigger use of the first antenna of the antenna module 1212. Thereafter, the switching module 1210 may optionally provide signaling 1266 to the first radio module 1206 to trigger use of a second antenna of the antenna module 1212 for performing the first operation.

In another aspect, when the type of the first operation is an idle mode, the switching module 1210 determines whether the apparatus 1202 is in an idle mode wake period. When the apparatus 1202 is in the idle mode wake period, the switching module 1210 identifies that the type of the second operation has the lower priority and refrains from switching the second radio module 1208 to use the first antenna during the idle mode wake period. When the apparatus 1202 is not in the idle mode wake period, the switching module 1210 determines that the apparatus 1202 is in an idle mode sleep period and identifies that the type of the second operation has a higher priority than the idle mode. The switching module 1210 may then provide signaling 1260 to the second radio module 1208 to trigger use of the first antenna of the antenna module 1212 during the idle mode sleep period.

The apparatus may include additional modules that perform each of the steps of the algorithm in the aforementioned flow chart of FIG. 8. As such, each step in the aforementioned flow chart of FIG. 8 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 13:
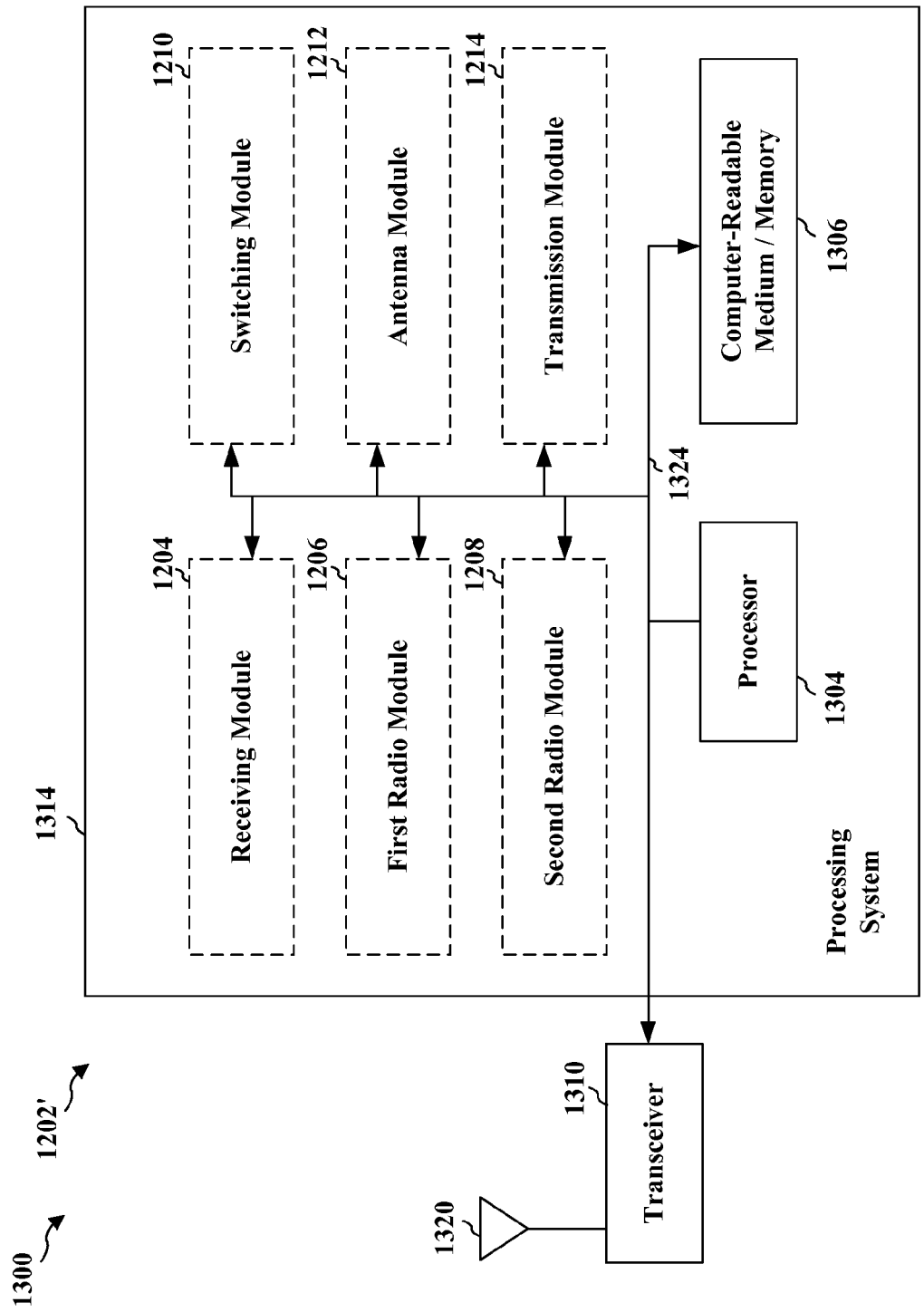
FIG. 13 is a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware modules, represented by the processor 1304, the modules 1204, 1206, 1208, 1210, 1212, 1214 and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the antenna module 1212 or receiving module 1204. In addition, the transceiver 1310 receives information from the processing system 1314, specifically the antenna module 1212 or transmission module 1214, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system further includes at least one of the modules 1204, 1206, 1208, 1210, 1212, and 1214. The modules may be software modules running in the processor 1304, resident/stored in the computer readable medium/memory 1306, one or more hardware modules coupled to the processor 1304, or some combination thereof. The processing system 1314 may be a component of the UE 650 and may include the memory 660 and/or at least one of the TX processor 668, the RX processor 656, and the controller/processor 659.

In one configuration, the apparatus 1202/1202' for controlling antenna switching wireless communication includes means for facilitating a first radio module to use a first antenna for performing a first operation; means for detecting that a second radio module will attempt to use the first antenna during transmit antenna selection for performing a second operation; means for determining whether to switch use of the first antenna from the first radio module to the second radio module based on a type of the first operation; means for determining whether the second operation is in a set of operations; means for refraining from switching the second radio module to use the first antenna when the second operation is in the set of operations; means for switching the second radio module to use the first antenna when the second operation is not in the set of operations; means for refraining from switching the second radio module to use the first antenna during an idle mode wake period; and means for switching the second radio module to use the first antenna during an idle mode sleep period.

The aforementioned means may be one or more of the aforementioned modules of the apparatus 1202 and/or the processing system 1314 of the apparatus 1202' configured to perform the functions recited by the aforementioned means. As described supra, the processing system 1314 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of controlling antenna switching, comprising:
   facilitating a first radio module to use a first antenna for performing a first operation;
   detecting that a second radio module will attempt to use the first antenna for a periodic transmission of a reference signal as a part of transmit antenna selection for performing a second operation while the first radio module is using the first antenna for performing the first operation; and
   determining whether to refrain from switching use of the first antenna from the first radio module to the second radio module based on a type of the first operation,
   wherein refraining from switching includes throttling an ability of the second radio module to perform the transmit antenna selection by lowering a frequency at which the second radio module performs the transmit antenna selection.

2. The method of claim 1, wherein the second radio module is an LTE radio module.

3. The method of claim 1, wherein the determining whether to switch use of the first antenna comprises:
   determining a type of the second operation; and
   refraining from switching the second radio module to use the first antenna when the type of the second operation has a lower priority than the type of the first operation.

4. The method of claim 3, the determining whether to switch use of the first antenna further comprising:
   determining whether the type of the second operation is in a set of operations; and
   identifying that the type of the second operation has the lower priority when the type of the second operation is in the set of operations.

5. The method of claim 4, wherein the type of the first operation comprises a voice call, and wherein the set of operations comprises at least one of:
   a LTE data-only service;
   an on-hold Voice over LTE (VoLTE) service; or
   a foreground VoLTE service while communicating at a high LTE signal quality.

6. The method of claim 4, the determining whether to switch use of the first antenna further comprising:
   identifying that the type of the second operation has a higher priority than the type of the first operation when the type of the second operation is not in the set of operations; and
   switching the second radio module to use the first antenna when the type of the second operation is not in the set of operations.

7. The method of claim 3, wherein the refraining comprises:
   refraining from switching the second radio module to use the first antenna for a duration of the first operation; or
   refraining from switching the second radio module to use the first antenna at a time slot used for performing the first operation.

8. The method of claim 4, wherein the type of the first operation comprises a delay-sensitive data call, and wherein the set of operations comprises at least one of:
   a LTE data-only service; or
   a Voice over LTE (VoLTE) service while communicating at a high LTE signal quality.

9. The method of claim 3, wherein the type of the first operation comprises an idle mode, the determining whether to switch use of the first antenna comprising:
   identifying that the type of the second operation has the lower priority during an idle mode wake period; and
   refraining from switching the second radio module to use the first antenna during the idle mode wake period.

10. The method of claim 9, the determining whether to switch use of the first antenna further comprising:
    identifying that the type of the second operation has a higher priority than the idle mode during an idle mode sleep period; and
    switching the second radio module to use the first antenna during the idle mode sleep period.

11. The method of claim 3, wherein the type of the first operation comprises a voice call or an operation conducted during a poor channel condition, and
    wherein the determining whether to switch use of the first antenna further comprises:
       determining that the type of the second operation is a sounding reference signal (SRS) transmission, and
       identifying that the type of the second operation has the lower priority when the type of the second operation is the SRS transmission.

12. The method of claim 11, wherein the determining whether to switch use of the first antenna further comprises dropping the SRS transmission.

13. An apparatus for controlling antenna switching, comprising:
    a memory; and
    at least one processor coupled to the memory and configured to:
       facilitate a first radio module to use a first antenna for performing a first operation;
       detect that a second radio module will attempt to use the first antenna for a periodic transmission of a reference signal as a part of transmit antenna selection for performing a second operation while the first radio module is using the first antenna for performing the first operation; and
       determine whether to refrain from switching use of the first antenna from the first radio module to the second radio module based on a type of the first operation,
    wherein refraining from switching includes throttling an ability of the second radio module to perform the transmit antenna selection by lowering a frequency at which the second radio module performs the transmit antenna selection.

14. The apparatus of claim 13, wherein the second radio module is an LTE radio module.

15. The apparatus of claim 13, wherein the at least one processor is configured to determine whether to switch use of the first antenna by:
    determining a type of the second operation; and
    refraining from switching the second radio module to use the first antenna when the type of the second operation has a lower priority than the type of the first operation.

16. The apparatus of claim 15, wherein the at least one processor is further configured to determine whether to switch use of the first antenna by:
    determining whether the type of the second operation is in a set of operations; and
    identifying that the type of the second operation has the lower priority when the type of the second operation is in the set of operations.

17. The apparatus of claim 16, wherein the type of the first operation comprises a voice call, and wherein the set of operations comprises at least one of:
    a LTE data-only service;
    an on-hold Voice over LTE (VoLTE) service; or
    a foreground VoLTE service while communicating at a high LTE signal quality.

18. The apparatus of claim 16, wherein the at least one processor is further configured to determine whether to switch use of the first antenna by:
    identifying that the type of the second operation has a higher priority than the type of the first operation when the type of the second operation is not in the set of operations; and
    switching the second radio module to use the first antenna when the type of the second operation is not in the set of operations.

19. The apparatus of claim 15, wherein the at least one processor is configured to refrain by:
    refraining from switching the second radio module to use the first antenna for a duration of the first operation; or
    refraining from switching the second radio module to use the first antenna at a time slot used for performing the first operation.

20. The apparatus of claim 16, wherein the type of the first operation comprises a delay-sensitive data call, and wherein the set of operations comprises at least one of:
    a LTE data-only service; or
    a Voice over LTE (VoLTE) service while communicating at a high LTE signal quality.

21. The apparatus of claim 15, wherein the type of the first operation comprises an idle mode, and wherein the at least one processor is further configured to determine whether to switch use of the first antenna by:
  identifying that the type of the second operation has the lower priority during an idle mode wake period; and
  refraining from switching the second radio module to use the first antenna during the idle mode wake period.

22. The apparatus of claim 21, wherein the at least one processor is further configured to determine whether to switch use of the first antenna by:
  identifying that the type of the second operation has a higher priority than the idle mode during an idle mode sleep period; and
  switching the second radio module to use the first antenna during the idle mode sleep period.

23. The apparatus of claim 15, wherein the type of the first operation comprises a voice call or an operation conducted during a poor channel condition, and
  wherein the at least one processor is further configured to determine whether to switch use of the first antenna by:
    determining that the type of the second operation is a sounding reference signal (SRS) transmission, and
    identifying that the type of the second operation has the lower priority when the type of the second operation is the SRS transmission.

24. The apparatus of claim 23, wherein the at least one processor is further configured to drop the SRS transmission.

25. An apparatus for controlling antenna switching, comprising:
  means for facilitating a first radio module to use a first antenna for performing a first operation;
  means for detecting that a second radio module will attempt to use the first antenna for a periodic transmission of a reference signal as a part of transmit antenna selection for performing a second operation while the first radio module is using the first antenna for performing the first operation; and
  means for determining whether to refrain from switching use of the first antenna from the first radio module to the second radio module based on a type of the first operation,
  wherein refraining from switching includes throttling an ability of the second radio module to perform the transmit antenna selection by lowering a frequency at which the second radio module performs the transmit antenna selection.

26. The apparatus of claim 25, wherein the means for determining whether to switch use of the first antenna is configured to:
  determine a type of the second operation;
  determine whether the type of the second operation is in a set of operations;
  identify that the type of the second operation has a lower priority when the type of the second operation is in the set of operations; and
  refrain from switching the second radio module to use the first antenna when the type of the second operation has the lower priority than the type of the first operation.

27. The apparatus of claim 26, wherein the means for determining whether to switch use of the first antenna is further configured to:
  identify that the type of the second operation has a higher priority than the type of the first operation when the type of the second operation is not in the set of operations; and
  switch the second radio module to use the first antenna when the second operation is not in the set of operations.

28. A non-transitory computer-readable medium storing computer executable code for wireless communication, comprising code for:
  facilitating a first radio module to use a first antenna for performing a first operation;
  detecting that a second radio module will attempt to use the first antenna for a periodic transmission of a reference signal as a part of transmit antenna selection for performing a second operation while the first radio module is using the first antenna for performing the first operation; and
  determining whether to refrain from switching use of the first antenna from the first radio module to the second radio module based on a type of the first operation,
  wherein refraining from switching includes throttling an ability of the second radio module to perform the transmit antenna selection by lowering a frequency at which the second radio module performs the transmit antenna selection.

29. The computer-readable medium of claim 28, wherein the code performing the step of determining whether to switch use of the first antenna is configured to:
  determine a type of the second operation;
  determine whether the type of the second operation is in a set of operations;
  identify that the type of the second operation has a lower priority when the type of the second operation is in the set of operations; and
  refrain from switching the second radio module to use the first antenna when the type of the second operation has the lower priority than the type of the first operation.

30. The computer-readable medium of claim 29, wherein the code performing the step of determining whether to switch use of the first antenna is further configured to:
  identify that the type of the second operation has a higher priority than the type of the first operation when the type of the second operation is not in the set of operations; and
  switch the second radio module to use the first antenna when the second operation is not in the set of operations.

31. The method of claim 1, wherein the throttling includes eliminating performance of transmit antenna selection by the second radio module while the first radio module uses the first antenna.

* * * * *